Figure 1:
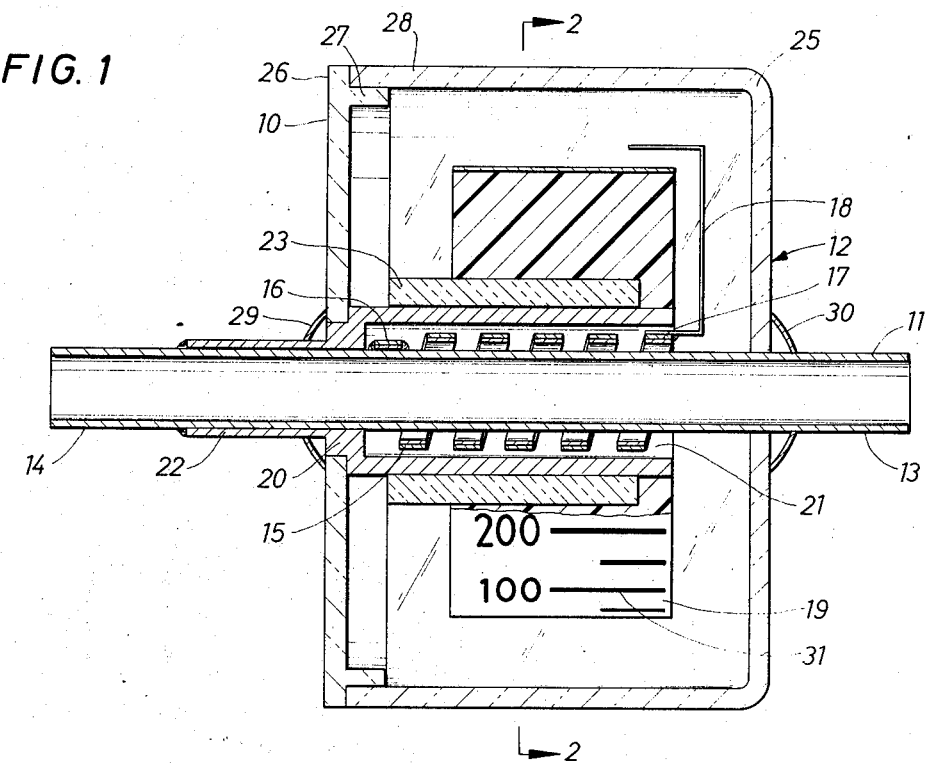

United States Patent
Luedeman

[15] 3,696,677
[45] Oct. 10, 1972

[54] FLOW-LINE THERMOMETER

[72] Inventor: Robert T. Luedeman, Metuchen, N.J.

[73] Assignee: Weston Instruments, Inc., Newark, N.J.

[22] Filed: Feb. 3, 1971

[21] Appl. No.: 112,363

[52] U.S. Cl. .............................. 73/343 R, 73/363.9
[51] Int. Cl. ......................... G01k 13/02, G01k 5/62
[58] Field of Search..... 73/343, 349, 347, 346, 363.9, 73/363.7

[56] References Cited

UNITED STATES PATENTS

| | | | |
|---|---|---|---|
| 1,756,660 | 4/1930 | Perry | 73/363.7 |
| 1,410,567 | 3/1922 | Harris | 73/363.7 |

FOREIGN PATENTS OR APPLICATIONS 1,091,268  11/1967  Great Britain...............73/349

*Primary Examiner*—Louis R. Prince
*Assistant Examiner*—Denis E. Corr
*Attorney*—William R. Sherman, Stewart F. Moore, Jerry M. Presson and Ernest R. Archambeau, Jr.

[57] ABSTRACT

This invention relates to a temperature measuring device for fluid streams. In the embodiment disclosed, a helical bimetallic element is wound along a tubular member. One end of the bimetal is attached to the tube and the other end is coupled to a pointer which rotates about a scale mounted on the tubular member to indicate the temperature of the fluid inside the tube.

5 Claims, 2 Drawing Figures

3,696,677

Robert T. Luedeman
INVENTOR

FLOW-LINE THERMOMETER

Bimetallic thermometers have been manufactured for household and industrial uses for many years. The usual construction has been a helix or a plurality of coaxial helices of bimetallic strips within a tubular shell, one end of the helix or helices being anchored to the shell and the other end being secured to a staff upon which a pointer is mounted for movement over a graduated scale plate in a plane normal to the axis of the bimetallic strip and the staff. Such arrangements have been utilized in flow line temperature monitoring wherein the bimetallic temperature responsive device is attached to the interior surface of a tube through which fluid flows. Yet other varieties of bimetallic temperature measuring devices have been devised. Among these, there are devices which may be inserted in a continuous tube or pipe and those which are attached at the outlet thereof. Temperature indications, in these arrangements, may be provided externally of the pipe or at some point remote therefrom.

None of the foregoing arrangements are suitable for use in industrial or research applications wherein it is necessary that temperatures be measured in small-diameter flow lines of a diameter of three-fourth inch or less. There is a requirement for apparatus of this type in diverse applications. They might, for example, be used to measure temperature in hydraulic lines, distillery tubing, water-flow lines in plastic industries, fusion pumps and condensers and a variety of laboratory devices.

Accordingly, it is an object of the present invention to provide a flow line thermometer capable of measuring and displaying temperature of fluids flowing through flow lines of small diameter when the installation of a conventional thermometer is impracticable or undesirable.

This and other objects of the present invention are attained by providing a temperature measuring device which is particularly adapted to indicate the temperature of a fluid flowing through small-diameter tubing. The temperature measuring apparatus of the present invention is comprised of a central tube having a helical bimetal element wound coaxially thereabout. One end of the bimetal element is attached to the tube and the other end of the element is coupled to an upright pointer which revolves about the tubular member adjacent to a graduated scale mounted on the tube. To protect the bimetal element from exterior thermal influences, a tubular heat-conductive shield is coaxially arranged around the element.

Figure 2:
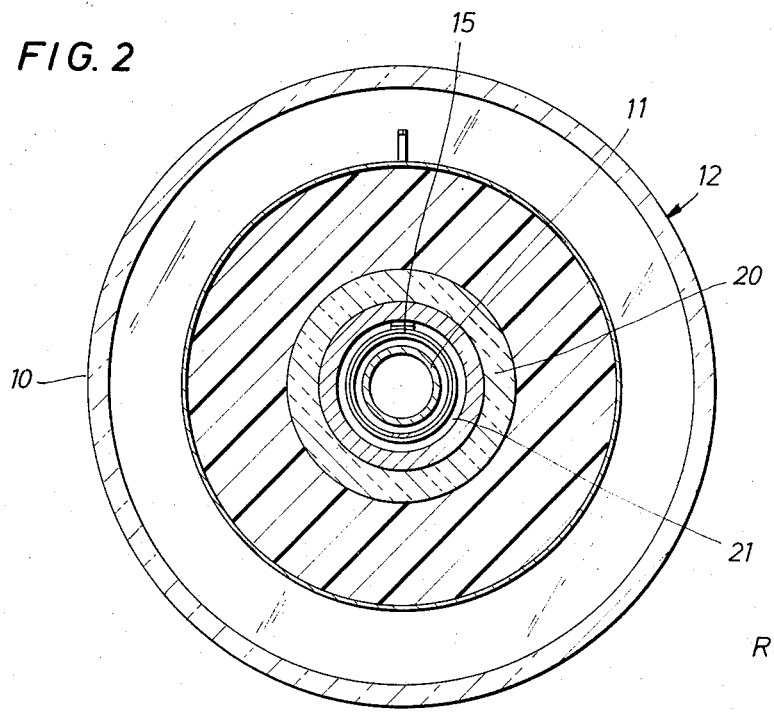

Further objects and advantages of the present invention will appear from the following description of a preferred embodiment thereof, taken in connection with the drawings attached hereto and in which:

FIG. 1 shows the apparatus partly in elevation and partly in quarter section; and FIG. 2 is a cross section taken along line 2—2 of FIG. 1.

Referring now to FIG. 1, a straight length of tubing 11, preferably of a corrosion resistant metal, is coaxially arranged within a cylindrical housing 12 so as to provide projecting end portions, as at 13 and 14, at opposite ends of the housing. A helical bimetallic temperature responsive element 15 is coaxially disposed around the tubing 11 and has one end secured as at 16 in a heat conducting relationship to the exterior of the tubing. The other end 17 of the helical element 15 is, of course, left free for rotational movement in relation to the tube 11 as the element expands and contracts in response to thermal changes experienced thereby. Suitable indicator means are provided such as an elongated pointer 18 which is coupled to the free end 17 of the helical element 15 and adapted for movement relative to a suitably arranged scale 19 within the housing 12. To isolate the temperature responsive element 15 from external thermal influences, a heat conductive tubular member 20 is coaxially arranged around the intermediate portion of the tube 11 and spaced outwardly therefrom to define an annular chamber 21 around substantially the full length of the helical element 15. In the preferred embodiment of the temperature indicator 10 the tubular shield 20 is reduced in diameter, as at 22, to provide an outwardly extending close-fitting mount around the tube 11. As further protection from external thermal influences, a band or ring of thermal insulating material 23 is mounted around the tubular shield 20.

In the preferred embodiment, the scale is formed about the periphery of a cylindrical plastic member which encloses completely the annular chamber 21. As illustrated, the scale 19 has graduations thereon spaced in accordance with the known temperature response of the bimetallic element 15 so that the rotation of the pointer 18 about the outer periphery of the scale 19 gives uniform easily readable indications of the temperatures within the tubing 11. A transparent case 24 is assembled from two parts; an outer cylindrical shell 25 and an end cap 26 provided for completing the enclosure of the thermal element 15. The outer cylindrical shell 25 is cooperatively fitted to the end cap 26 by mating shoulders as at 27 and 28. End clamps 29 and 30 are disposed at opposite ends of the apparatus 10 and are fitted over the tubular member 11 at one end and over the outwardly extending mount 22 at the opposite end. In this manner, the transparent case is secured tightly to the mount 22 and the central tubular member 11.

It will be appreciated that the temperature indicator 10 is readily adapted for various sizes of small-diameter tubing lines. As shown in FIGS. 1 and 2, the tubular shield 20 and the portion thereof having a reduced diameter 22 forms a through bore 21 through the housing 12. In the preferred embodiment the through bore 21 is sized to accommodate tubular members inserted therein with diameters varying up to three-quarters of an inch.

Such latitude in selection of the diameter of the tube 11 is occasioned by the ability to vary the number of turns of the bimetallic helical temperature responsive member 15 without affecting the accuracy of the temperature indications. As may be readily appreciated, the bimetallic element 15 is wound so that the number of turns in the helical element are a function of the diameter of the central tubular member 11. Thus, the rotation of the indicator or pointer 18 about the tubular scale 19 is functionally related to the coefficients of linear expansion of materials within the bimetallic element 15 and is therefore independent of the number of turns of the element. Irrespective of the size of the tube 11, the tubular scale is of uniform standard size with the distance between the temperature graduations 31 being invariant regardless of the number of turns of the bimetallic element 15 about the central tubular member. Thus, the temperature indicator of the present invention can be used in a variety of applications wherein the fluid flow is through small-diameter thin-wall tubing lines of different sizes.

In operation, the apparatus 10 of the present invention is coupled into a tubing line of the same diameter as the central tubular member 11 of the apparatus. This is accomplished by removing an appropriate length of the precess flow line and coupling the central tubular member 11 thereto by typical tubing connectors (not shown) or by typical fusion-joining techniques. As fluids pass through the central tubular member 11, the temperature responsive bimetallic element 15 expands or contracts in response to temperature variations. A change in the temperature of the fluid inside the central tube 11 accordingly causes a proportionally-related rotation of the indicator 18 about the externally disposed temperature scale 19.

While a particular embodiment of the present invention has been shown and described, it is apparent that changes and modifications may be made without departing from this invention in its broader aspects. It is, therefore, the aim in the appended claims to cover all such changes and modifications that fall within the true spirit and scope of this invention.

I claim:

1. A temperature indicating device adapted for indicating the temperature of fluids within a tubular flow line and comprising:

an elongated tubular flow line section having open upstream and downstream ends respectively adapted to be coupled to spaced upstream and downstream portions of such a flow line for carrying fluids passing between the spaced portions thereof and through said flow line section;

a bimetallic temperature-responsive element having one end thereof coupled in heat-conducting relationship to said flow line section and a free portion thereof arranged in a helical configuration encircling said flow line section;

a housing enclosing said flow line section and said temperature-responsive element and having at least a portion thereof providing visual access to the interior of said housing;

means within said housing operatively arranged on said flow line section about said temperature-responsive element and adapted for isolating said temperature-responsive element from exterior thermal influences; and temperature-indicating means including a graduated scale member and a pointer member disposed adjacent to said visual access housing portion for providing indications of the temperatures of a fluid passing through said flow line section, one of said indicating members being fixed in relation to said flow line section and the other of said indicating members being coupled to said free portion of said temperature-responsive element for movement in relation to said one indicating member in response to thermally induced movements of said temperature-responsive element.

2. The apparatus of claim 2 wherein said pointer member is coupled to said free portion of said temperature-responsive element, and said graduated scale member is fixed in relation to said tubular member.

3. A temperature indicating device adapted for indicating the temperature of fluids within a tubular flow line and comprising:

a tubular fluid conduit having open upstream and downstream ends respectively adapted to be coupled to spaced upstream and downstream sections of a flow line for carrying fluids passing between such spaced flow line sections and through said fluid conduit;

a bimetallic temperature-responsive element having one end thereof secured in heat-conducting relationship to one end portion of said fluid conduit and a freely movable helical portion coaxially encircling said fluid conduit and extending therearound toward the other end portion thereof;

a cylindrical housing mounted on said fluid conduit between its said ends coaxially enclosing said fluid conduit and said temperature-responsive element and having at least an exterior portion thereof providing a view of the interior of said housing;

a tubular shield of a thermally conductive material coaxially arranged within said housing around said fluid conduit nd having a first portion secured in heat-conducting relationship to said one end portion of said fluid conduit and a second enlarged portion extending toward said other end portion thereof defining an annular chamber surrounding said helical portion of said temperature-responsive element to protect said temperature-responsive element from thermal influences exterior of said housing;

a pointer coupled to the free end of said helical portion of said temperature-responsive member; and a scale arranged in said housing adjacent to said pointer and having graduations thereon spaced in conformity with predetermined movements of said pointer by said temperature-responsive element.

4. The apparatus of claim 3 wherein said housing is formed substantially of a transparent material and includes first and second interconnecting members, one of said housing members having a closed end portion and an open end portion, the other of said housing members forming a second end portion having an outwardly extending radially-disposed projection formed about the periphery of one face thereof to matingly engage the other of said housing members.

5. The apparatus of claim 3 and further including thermal-insulating means coaxially arranged around said tubular shield for maintaining said chamber at a temperature approximately that of said fluid conduit.

* * * * *